United States Patent [19]

Doring et al.

[11] Patent Number: 5,595,644
[45] Date of Patent: Jan. 21, 1997

[54] METHOD AND DEVICE FOR THE ELIMINATION OF TOXIC MATERIALS FROM, IN PARTICULAR, THE TOPSOIL

[75] Inventors: Falk R. Doring; Niels Doring, both of Stuttgart, Germany

[73] Assignee: P + P Geotechnik GmbH, Stuttgart, Germany

[21] Appl. No.: 374,532
[22] PCT Filed: Jul. 16, 1993
[86] PCT No.: PCT/EP93/01878
 § 371 Date: Mar. 14, 1995
 § 102(e) Date: Mar. 14, 1995
[87] PCT Pub. No.: WO94/02264
 PCT Pub. Date: Feb. 3, 1994

[30] Foreign Application Priority Data

Jul. 17, 1992 [DE] Germany .............. 42 23 666.5
Jan. 19, 1993 [DE] Germany .............. 43 01 270.1

[51] Int. Cl.⁶ .................................................. C02F 1/461
[52] U.S. Cl. ............................................ 205/766; 588/204
[58] Field of Search ............................... 204/130, 182.2, 204/180.1, 301, 299 R; 205/766; 588/204

[56] References Cited

U.S. PATENT DOCUMENTS 4,988,427  1/1991  Wright ...................................... 204/304
5,074,986  12/1991  Probstein et al. ....................... 204/130
5,137,608  8/1992  Acar et al. ............................... 204/130
5,256,264  10/1993  Hundenborn et al. .................. 204/149

FOREIGN PATENT DOCUMENTS 0312174  4/1989  European Pat. Off. .
0403895  12/1990  European Pat. Off. .
3600772  7/1987  Germany .
3920342  8/1990  Germany .
3929634  3/1991  Germany .
4007805  9/1991  Germany .
4013068  10/1991  Germany .

OTHER PUBLICATIONS

Land & Water–nu/Milieutechniek Nr. 5 (1988), (no month) "Elektro–reclamatie, een nieuwe techniek voor in–situ reiniging".

Primary Examiner—Arun S. Phasge
Attorney, Agent, or Firm—Jacobson, Price, Holman & Stern, PLLC

[57] ABSTRACT

A method of removing harmful substances, particularly in the region of the earth's surface, wherewith an electrical voltage is applied to electrodes introduced into the soil. To remove the harmful substances, an electric field is established in situ by the electrical voltage, the intensity of which field is so great that harmful substances which are not electrokinetically transportable are broken up and/or degraded in place.

16 Claims, 1 Drawing Sheet

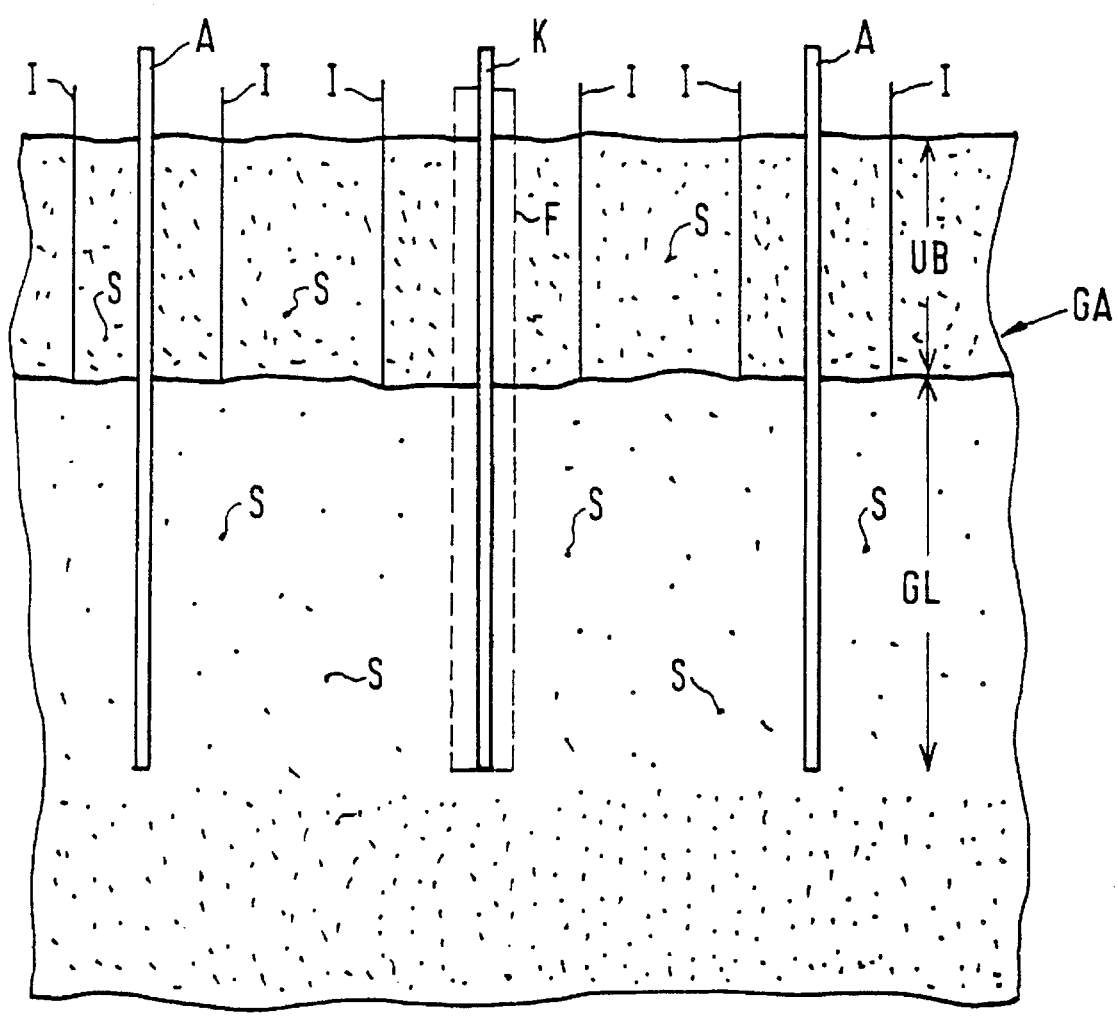

METHOD AND DEVICE FOR THE ELIMINATION OF TOXIC MATERIALS FROM, IN PARTICULAR, THE TOPSOIL

FIELD OF THE INVENTION

The invention relates to a method for removing harmful substances, particularly in the earth's surface (hereinafter, "soil"); and an apparatus for carrying out this method.

BACKGROUND OF THE INVENTION

Ger. Pat. 3,920,342 discloses a method of decontaminating a contaminated soil region wherein a contaminant which is electrokinetically transportable and is contained in a soil region which contains an electrically conducting liquid is collected electrophoretically at at least one predetermined location of the soil region. For this purpose, a well is sunk in the soil region, wherewith the well tubing extends through the aquifer layer. An underpressure is applied to this well, whereby the soil gases contained in the soil, along with the harmful substance[s] therein, are removed by suction. In the middle of the well a lance-shaped central cathode is disposed which extends through the aquifer layer and the non-aquifer layer thereabove. At a small distance from the well, e.g. 6 m, a plurality of lance-chaped anodes are disposed. By applying a voltage between the anodes and the central cathode, an electric field directed radially toward the cathode is produced in the aquifer layer and the non-aquifer layer thereabove. The electric current produced in the aquifer layer, and the non-aquifer layer thereabove, by the applied voltage, causes ions of the harmful substance[s] to be produced by thermal ionization and to migrate toward the well. The known method is used exclusively in connection with electrokinetically transportable harmful substances.

The underlying problem of the present invention is to devise a method and apparatus for electrochemical removal of harmful substances, particularly in the earth's surface, whereby harmful substances can be removed, particularly in the earth's surface, in place (in situ), without local displacement or excavation.

SUMMARY OF THE INVENTION

The essential advantage consists of the fact that the invention enables one, for the first time, to break down harmful substances in situ in the earth's surface, without local displacement or excavation, even if such substances are not electrophoretically transportable, and even if ground water is not available as a transport medium (due to the soil not being saturated with water, i.e. in a non-aquifer region of the soil). Thus the invention makes it possible for the first time to remove nearly all organic substances and convert them essentially to the non-harmful substances carbon dioxide and water. The treatable substances include all organic compounds which can be decomposed by oxidation, even including nonpolar compounds, and including polar compounds which are first rendered nonpolar in the use of the inventive method (e.g. phenols, which are converted to benzenes after removal of the OH group). The invention is effective for organic harmful substances in solid, liquid, or gaseous form. Long-chain compounds, for example, are first broken down and are converted to progressively shorter-chain compounds, until the oxidation stage to produce carbon dioxide. E.g., by application of the method heptacosane ($C_{27}H_{56}$) and triacontane ($C_{30}H_{62}$) are degraded in a series of steps, to, e.g. , octane, propane, and butane, and eventually are oxidized to carbon dioxide. In the case of organic compounds with more complex structures, e.g. salicylic acid, first the substituent groups ("radicals") (OH and COOH groups) are removed and then the benzene nucleus is degraded by electrochemical action, to yield carbon dioxide and water. Polycyclic compounds, e.g. anthracene, are first cleaved to form individual benzene rings, and these are subjected to electrochemical oxidation. In contrast to electrophoresis, in these processes the harmful substances do not migrate in the soil. In other words, the decomposition and oxidation of the harmful substances occurs where said substances lie. Similar processes take place when the invention is applied to non-ionizable in organic materials. Thus, e.g., the molecular structure of the non-water-soluble mercury sulfide (HgS) is broken by application of the method, to form mercury and elemental sulfur. The now separate chemical elements can be electrokinetically transported, in part in colloidal form. It is also advantageous that the described method is practically unlimited as to operating depth, thus, e.g., cleanups using the described method are planned at depths to 106 m. According to the invention one can also advantageously use the method for cleanup of excavated soil, sludges, slurries, and other wastes, contained in containers of arbitrary types, e.g. in lagoons or the like constructed of earthwork, steel, plastic, or concrete.

The following steps led to the invention: It was found in field studies that harmful substances present in non-aquifer soil and/or in the aquifer region or stored in containers, vessels, or lagoons, as contaminated excavated material, contaminated sludge, or the like, and not candidates for eleotrophoresis methods, can be removed if an electric field of defined voltage and current is applied (preferably DC or pulsed current, depending on the type of harmful substances and the soil characteristics). E.g., such a field at an applied voltage of 61 V and a current of 100 A over a period of 35 da resulted in a reduction of:

the phenol index from, e.g., 1.05 mg/kg soil to 0.07 mg/kg soil, mineral oil hydrocarbons from 4,600 mg/kg soil to 40 mg/kg soil, benzene, toluene, and xylene aromatics from 1,584 mg/kg soil to 62.1 mg/kg soil, polycyclic aromatics (on the USEPA list) from 40.8 mg/kg soil to 16.2 mg/kg soil, and haloorganics (measured as extractable haloorganics) from 28 mg/kg soil to below the limit of detection of the analytical method used.

In another field test, for example, over 35 days, soil contamination with phenols was reduced from 289 mg/kg soil to 0.24 mg/kg soil. In the first-mentioned test, the following materials were removed via the underground gas plume over the 35 da period: 224.2 kg of (primarily) benzenes and xylenes, 2,246.2 kg carbon dioxide, 5.0 kg octane, 3.6 kg butane and propane (expressed as propane), and 0.8 kg $NO_x$. Bond enthalpies were liberated in the degradation of the harmful substances in the soil, resulting in the following net temperature increases (for 61 V and 100 A):

ground water temperature 3° C. (initial [temperature increase] 7.1° C., decreasing to 0.9° C.);

ground temperature in the aquifer zone 25° C., remaining at a relatively constant level over the duration of the test.

In order to bring about the decomposition and degradation of the harmful substances in the soil, five conditions need to prevail:

1) In order to establish the necessary electric field strength for breaking up and decomposing the harmful substances in situ, the conductivity of the soil in both the aquifer and non-aquifer must be increased by ionization, e.g. from an original value slightly above 0.5 MHo per cm to 1.2 Mho per cm.

2) A high voltage must be applied to the electrodes. The value of the voltage, e.g. on the order of 1 kV–90 kV, depends on the distance between the electrodes.

3) It is sufficient if the residual soil moisture is 5 wt. %. In cases where ionization does not develop or does so only slowly, due to dry soil conditions, it is advisable to moisten the soil artificially, and possibly also to employ means to keep the soil moist.

4) In order to achieve optimal current, the surfaces of the electrodes must be chosen to be as large as possible. In the test apparatuses, hollow steel rods with nominal diameter 2–6 in (125 mm) were used.

5) The parameters of the current employed must be arranged such that the electron affinities of the respective molecular groups (moieties or "radicals") of which the harmful substances are comprised are exceeded.

In carrying out the inventive method, as a rule two steps are employed. For ground areas of up to c. 100 sq m to be recontaminated, a two-electrode apparatus suffices, i.e. two electrodes usually in the form of steel rods (or hollow steel rods) are introduced into the soil to levels below the main deposit of harmful substances. For larger ground areas (>100 sq m), a multielectrode apparatus is recommended, distributed in a suitable manner (preferably in a grid-like array, e.g., 6×8 m separations or up to 10×10 m, or polygonally). First, the soil region to be decontaminated, located between two electrodes, is subjected to ionization by application of a high voltage. In the above-described test apparatuses, the ionization was established in <0.5 sec at 1000 V and 3.3 A and an electrode separation of, e.g., c. 8.1 m. When a multi-electrode apparatus is used, the ionization of the soil can be carried out using one electrode configuration which is advantageously disposed centrally in the field i.e. array, which configuration is comprised of an anode and a cathode; or using a plurality of electrode pairs selected in the field [i.e. array], but not all electrode pairs. When containers are used, it is recommended that plate- and/or grid electrodes be used. E.g. in the case of a steel container, e.g., the container itself may be employed as an electrode, with the opposite electrode being in the form of, e.g., a plate electrode disposed centrally in the container.

After ionizing the soil, the operating voltage is switched on. Preferably the voltage is regulated via the measured current, because the latter serves as an indicator of electron flow in the soil. The regulation depends on the types of harmful substances present which are to be degraded and on the electron affinities of the atoms and other moieties ("radicals") of which the harmful substances are comprised. For example, there are large differences in current intensities required with the following substances (in descending order of current intensities):

benzenes>>polycyclic compounds>>haloorganics >>phenols>>nitro- and nitroso compounds.

The harmful substances may be degraded by the applied energy by means of removal of the substituent group(s) ("radical(s)"), and subsequent oxidation of the nuclei (or chains) by electron abstraction (=anodic oxidation) or electron addition (=cathodic reduction). In the case of anodic oxidation, the electrolysis of the water plays a contributing role in oxidation of the harmful substances via the resulting oxygen (nascent oxygen) which is liberated, and/or the harmful substances are, e.g., cathodically hydrated [sic].

As an example, the oxidation of carbon yields carbon dioxide and very small amounts of carbon monoxide. Hydrogen is oxidized to water. Chlorine which is removed reacts to form chlorides, while nitrogen-containing substituents are liberated as oxides of nitrogen ($NO_x$). Sulfur which is removed is formed into colloidal sulfur, and is reactive in that form.

Because the degradation products and oxidation products are primarily gases, advantageously, according to the state of the art, the hollow anode rod(s) and/or the hollow cathode rod(s) are provided with air suction means to remove the gaseous substances from the soil, and/or they are provided with a ground water purification device according to the state of the art.

Generally speaking, the breakup and degradation of the harmful substances in the electric field in situ is accompanied by their breakdown into their basic component substances, which are then further converted by complex processes.

In contrast to the known electrophoresis and electroosmosis processes, application of the described method does not cause the harmful substances to move—the substances are not mobilized. Of decisive importance in the use of the invention for degrading harmful substances in situ is the fact that the current and field are chosen sufficiently large supply the necessary dissassociation or atomization energy needed for such degradation.

BRIEF DESCRIPTION OF THE DRAWING

The FIGURE is a suitable apparatus for implementing the process.

DETAILED DESCRIPTION OF THE PREFERRED EMBODIMENT

In the FIGURE, the soil region is designated GA. In its lower reaches it has an aquifer GL. The soil region above the aquifer, and the aquifer, are contaminated with harmful substances, up to the soil surface. The non-aquifer region of the soil above the aquifer GL is designated UB.

An electrode K is inserted into the soil region GA, extending, in the example supposed, through the aquifer GL and non-aquifer UB.

At a small distance, e.g. 6–12 m, from electrode K, which electrode may be part of a row or polygonal configuration of electrodes, one or more additional electrodes A are disposed—if only one electrode A the arrangement is a two-electrode arrangement; if more than one electrode A these may be arranged in rows or polygonal configurations—i.e. arrays. In the example supposed, the electrodes A serve as anodes and the electrodes K as cathodes. When a voltage is applied between electrodes A and K, a radial field E is produced, directed toward the cathode[s]. As mentioned supra, after the ionization is produced this field must be so strong that a current results which provides the dissociation- and/or atomization energy for the harmful substance S in the aquifer GL and in the non-aquifer UB.

If as a consequence of the normally low water content in the non-aquifer UB no current can be produced there, the non-aquifer UB should be irrigated or wetted in a suitable manner, e.g. by spray irrigation or through one or two hollow rods of an electrode pair; possibly the non-aquifer will be kept moist in this way. Persistent moistness can be brought about, e.g., if the hollow rods of the electrodes (A, K) are in the form of so-called well filter tubes, into which water is introduced. In addition, separate injection lances I may be provided according to the state of the art, for supplying water, which lances are inserted into the non-aquifer soil region UB.

In order to achieve selective decomposition of the harmful substances in local regions of the soil region GA, the electrodes (A, K) can be partially isolated, so that a field is produced only in the desired local regions.

Examples of some (among many) harmful substances which are decomposable according to the inventive method are: benzenes, toluenes, xylenes, nitro compounds (e.g. nitro-, dinitro-, and trinitrotoluenes), phenols and compounds of phenols (including derivatives such as cresols), aromatic amines, aromatic compounds such as salicylic acid or aniline, polycyclic aromatics (PACs), cyclic compounds (such as, e.g., N-methyl-2-pyrrolidone), clipboric compounds (such as, e.g., penta- or hepatcosane), mineral oil hydrocarbons, haloorganics, cyano compounds. unrefined pharmaceutical materials, chemical warfare agents (such as, e.g. mustard gas, phosgene, and ethyl N,N-dimethylphosphoramidocyanide (Tabun)), haloorganics, pesticides, etc. In addition, water-insoluble compounds (such as, e.g., certain chromium-, lead- or mercury compounds can be broken up by means of electrochemical oxidation, and the products therefrom can be largely transported in colloid form.

The electrodes (A, K) may be in the form of solid rods or hollow electrodes (of solid construction or as filter tubes). The electrodes (A, K) may be disposed in a well (as is seen with the electrodes K in the accompanying FIGURE) which well is itself formed by a so-called filter tube F which is preferably comprised of plastic. The electrodes may also be in the form of grids or plates.

We claim:

1. A method of eliminating harmful materials in a ground region, said method comprising:

applying an electrical voltage to electrodes disposed in said ground region;

causing harmful materials to decompose in situ by production of an ionization channel between said electrodes via said application of a voltage in the ground region so as to increase the conductivity of said ground region; and regulating the electrical voltage by adjusting the current such that the energy supplied is equal to or greater than the electron affinity of the atoms of which the harmful materials are comprised in said ground region.

2. A method according to claim 1, wherein partially insulated electrodes are employed in prescribed zones of said ground region for selective decomposition of the harmful materials.

3. A method according to claim 2, wherein water is artificially supplied to said ground region prior to establishment of the field, to increase the moisture in said ground region.

4. A method according to claim 3, wherein water is supplied via injection lances inserted into said ground region.

5. A method according to claim 3, wherein water is introduced into said ground region via electrodes which are hollow and water-permeable.

6. A method according to claim 3, wherein water is introduced into said ground region via electrodes comprised of a solid structure which is surrounded by at least one filter tube into which water is introduced into a space between the solid structure and the at least one filter tube.

7. A method according to claim 1, wherein the current is one of a direct current, an alternating current, a frequency-modulated alternating current, and a pulsating current, dependent upon the characteristics of the harmful materials.

8. A method according to claim 1, wherein gaseous decomposition products which are liberated during the process of elimination of the harmful materials are suctioned away at the locations of the electrodes.

9. A method according to claim 1, wherein the harmful materials undergo oxidation by electron reactions.

10. A method according to claim 1, wherein the harmful materials are present in at least one of waste piles, slurry impoundments, and other depositions of waste matter introduced into an enclosure, and the electrodes are disposed in said enclosure.

11. A method according to claim 10, wherein the electrodes are one of plate electrodes and filter electrodes and are disposed generally facing each other.

12. A method according to claim 10, wherein hollow electrodes are disposed in said enclosure.

13. A method according to claim 10, wherein the enclosure has an electrically conducting wall which is employed as an electrode.

14. A method according to claim 1, wherein the electrodes disposed in the ground region are one of solid rod electrodes, hollow electrodes configured as continuous-walled tubes and electrodes configured as one of meshes and plates.

15. A method according to claim 14, wherein each of the electrodes is disposed in a well which is one of covered with and encased in plastic filter tubes.

16. A method according to claim 14, wherein the electrodes comprise a system of a plurality of electrodes arranged in one of a grid-like and polygonal pattern in said ground region.

* * * * *